(12) United States Patent
Hanig et al.

(10) Patent No.: US 7,654,048 B2
(45) Date of Patent: Feb. 2, 2010

(54) GRAIN BIN ROOF RING MOUNTING BRACKET

(75) Inventors: John A. Hanig, Sheffield, IA (US); Charles E. Sukup, Dougherty, IA (US)

(73) Assignee: Sukup Manufacturing Co., Sheffield, IA (US)

( * ) Notice: Subject to any disclaimer, the term of this patent is extended or adjusted under 35 U.S.C. 154(b) by 606 days.

(21) Appl. No.: 11/160,186

(22) Filed: Jun. 13, 2005

(65) Prior Publication Data

US 2006/0277865 A1 Dec. 14, 2006

(51) Int. Cl.
*E04B 1/32* (2006.01)
(52) U.S. Cl. .................. 52/248; 52/192; 52/745.06
(58) Field of Classification Search .......... 52/302.2, 52/192, 25, 24, 223.3, 248, 82, 745.06, 745.21, 52/245; 403/24, 386, 395, 400; 24/276, 24/277; 248/301, 303, 304, 903
See application file for complete search history.

(56) References Cited

U.S. PATENT DOCUMENTS

| | | | | | |
|---|---|---|---|---|---|
| 973,687 | A | * | 10/1910 | Naylor ........................ 52/152 |
| 1,019,180 | A | * | 3/1912 | Naylor ........................ 52/152 |
| 1,125,249 | A | * | 1/1915 | Archer ........................ 52/266 |
| 1,425,860 | A | * | 8/1922 | Johnson ........................ 52/21 |
| 2,079,768 | A | * | 5/1937 | David ........................... 52/25 |
| 2,724,151 | A | * | 11/1955 | Stack .......................... 52/262 |
| 3,237,295 | A | * | 3/1966 | Konzak ....................... 29/429 |
| 3,414,219 | A | * | 12/1968 | Siegel ......................... 248/65 |
| 4,100,654 | A | * | 7/1978 | Sheng ........................ 24/20 R |
| 4,372,017 | A | * | 2/1983 | Heckethorn ................. 24/277 |
| 4,479,288 | A | * | 10/1984 | Jones .......................... 24/277 |
| 5,014,940 | A | * | 5/1991 | Sherman ................... 248/74.1 |
| 5,215,281 | A | * | 6/1993 | Sherman ................... 248/74.1 |
| 5,607,127 | A | * | 3/1997 | Ballonez ...................... 248/72 |
| 5,632,567 | A | * | 5/1997 | Lowe et al. .................... 403/3 |
| 5,961,248 | A | * | 10/1999 | Tourtellotte ................ 403/400 |
| 6,227,757 | B1 | * | 5/2001 | Delouvee et al. ........... 403/400 |
| 6,308,384 | B1 | * | 10/2001 | Normal et al. ................ 24/277 |
| 6,347,904 | B1 | * | 2/2002 | Knighton .................... 403/400 |
| 6,357,184 | B1 | * | 3/2002 | Alley ............................ 52/25 |
| 6,561,473 | B1 | * | 5/2003 | Ianello ...................... 248/219.4 |

* cited by examiner

*Primary Examiner*—Robert J Canfield
*Assistant Examiner*—James J Buckle, Jr.

(57) ABSTRACT

A grain bin roof ring mounting bracket having a mounting plate secured to a roof bin, a clip portion extending vertically from the mounting plate, and a back portion that extends outwardly from the clip portion.

14 Claims, 5 Drawing Sheets

GRAIN BIN ROOF RING MOUNTING BRACKET

BACKGROUND OF THE INVENTION

The present invention is directed toward a mounting bracket for securing a roof ring to the roof of a grain bin, and more particularly to an improved mounting bracket that more rigidly secures the roof ring to a grain bin roof.

Roof rings are known in the art and are attached to the roof of a grain bin to add greater strength to the roof in order to handle both wind and snow loads. Under high winds it is particularly critical that the roof ring is rigid and maintains its integrity. If the ring loses its integrity or roundness its strength will decrease which potentially could lead to the collapse of the bin roof.

Various mounting brackets have been used to secure the roof ring to the bin roof. One such bracket, as shown in FIG. 1 has a clip portion with an arcuate notch that frictionally receives the roof ring tubing. While it is easy to install the roof ring with this bracket, under high wind and snow loads the ring occasionally may become dislodged from the arcuate notch.

Other mounting brackets have been used that have an aperture through which the ring is inserted or a bracket that completely surrounds the roof ring. While these brackets provide a more rigid connection, installation is more difficult as the exact number of brackets must be slipped over the ring prior to installation. Accordingly, there is a need in the art for an improved roof ring mounting bracket.

Therefore, a principal objective of the present invention is to provide a mounting bracket that allows for both easy installation and a rigid connection of a roof ring to the roof of a grain bin.

This and other objectives will be apparent to those skilled in the art based on the following description.

SUMMARY OF THE INVENTION

A mounting bracket secured to the roof of a grain bin having a mounting plate, a clip portion extending upwardly from the mounting plate, and a back plate that extends outwardly from the clip portion. The clip portion has a notch that frictionally receives a roof ring. The back plate has at least one aperture that receives a bolt that fits around the roof ring to rigidly secure the ring to the mounting bracket. Alternatively the mounting bracket has a mounting plate with a clip portion extending upwardly, the clip portion having at least one aperture for receiving a bolt.

DESCRIPTION OF THE PREFERRED EMBODIMENT

Figure 1:
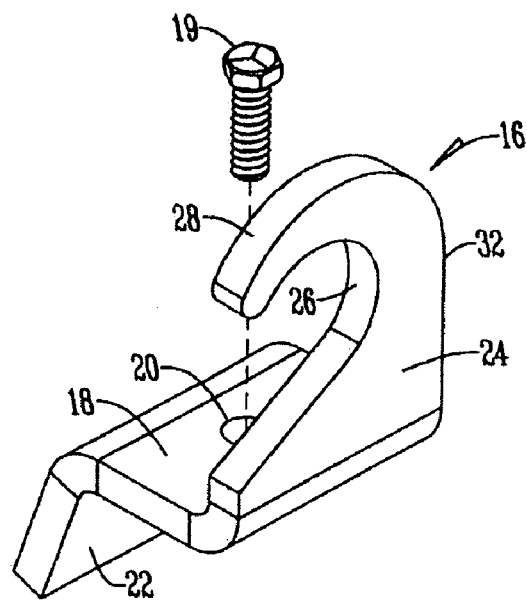
FIG. 1 is a perspective view of a prior art mounting bracket.
Figure 2:
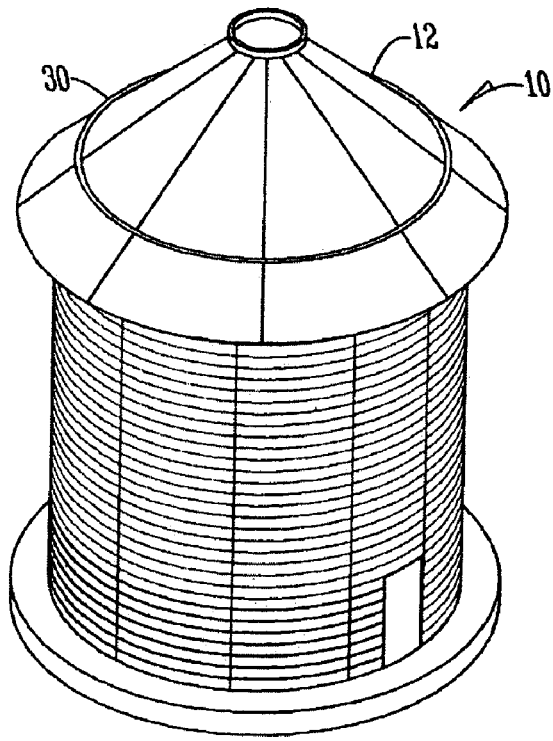
FIG. 2 is a side view of a grain bin with a roof ring assembly.
Figure 3:
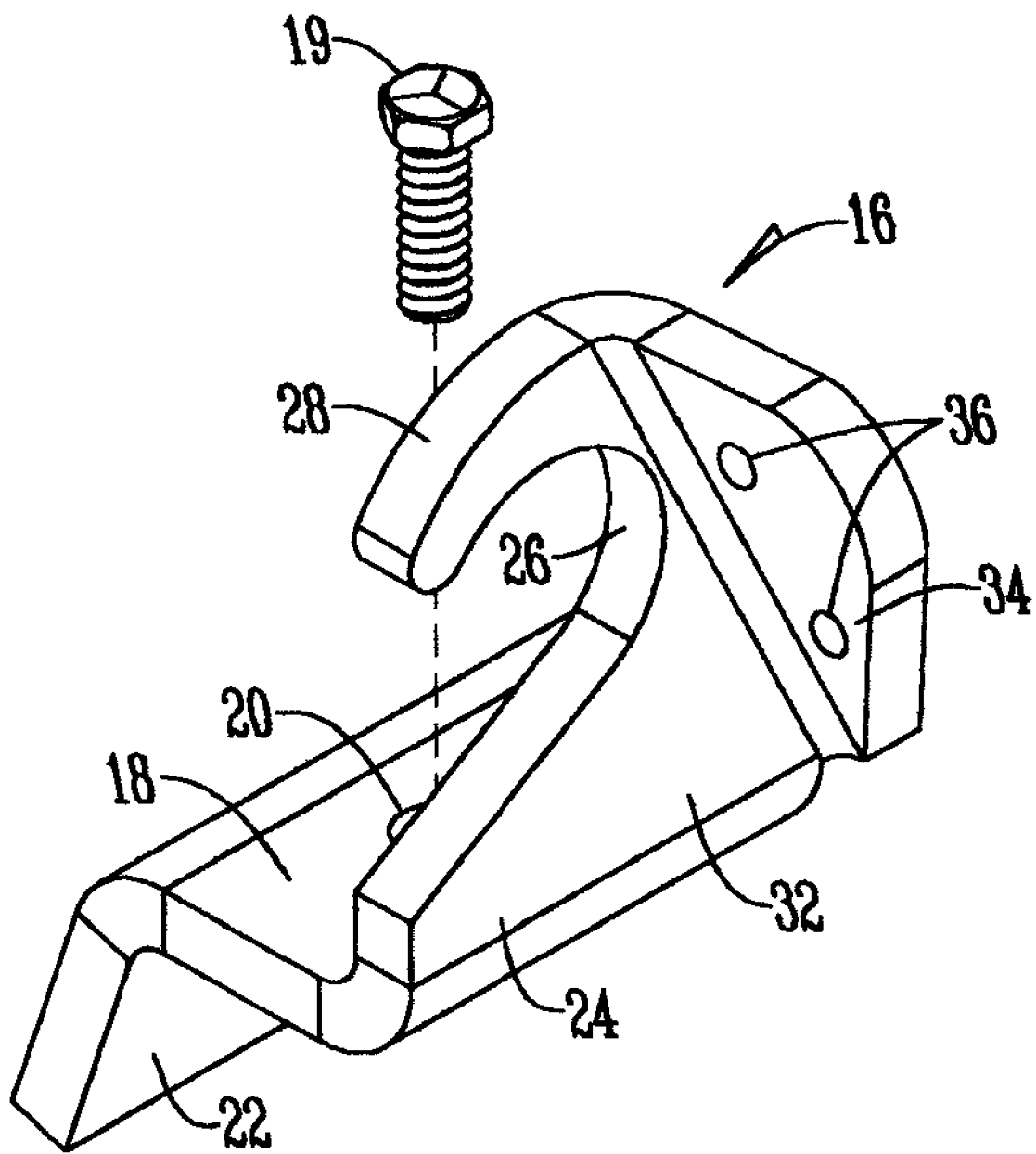
FIG. 3 is a perspective view of a mounting bracket.
Figure 4:
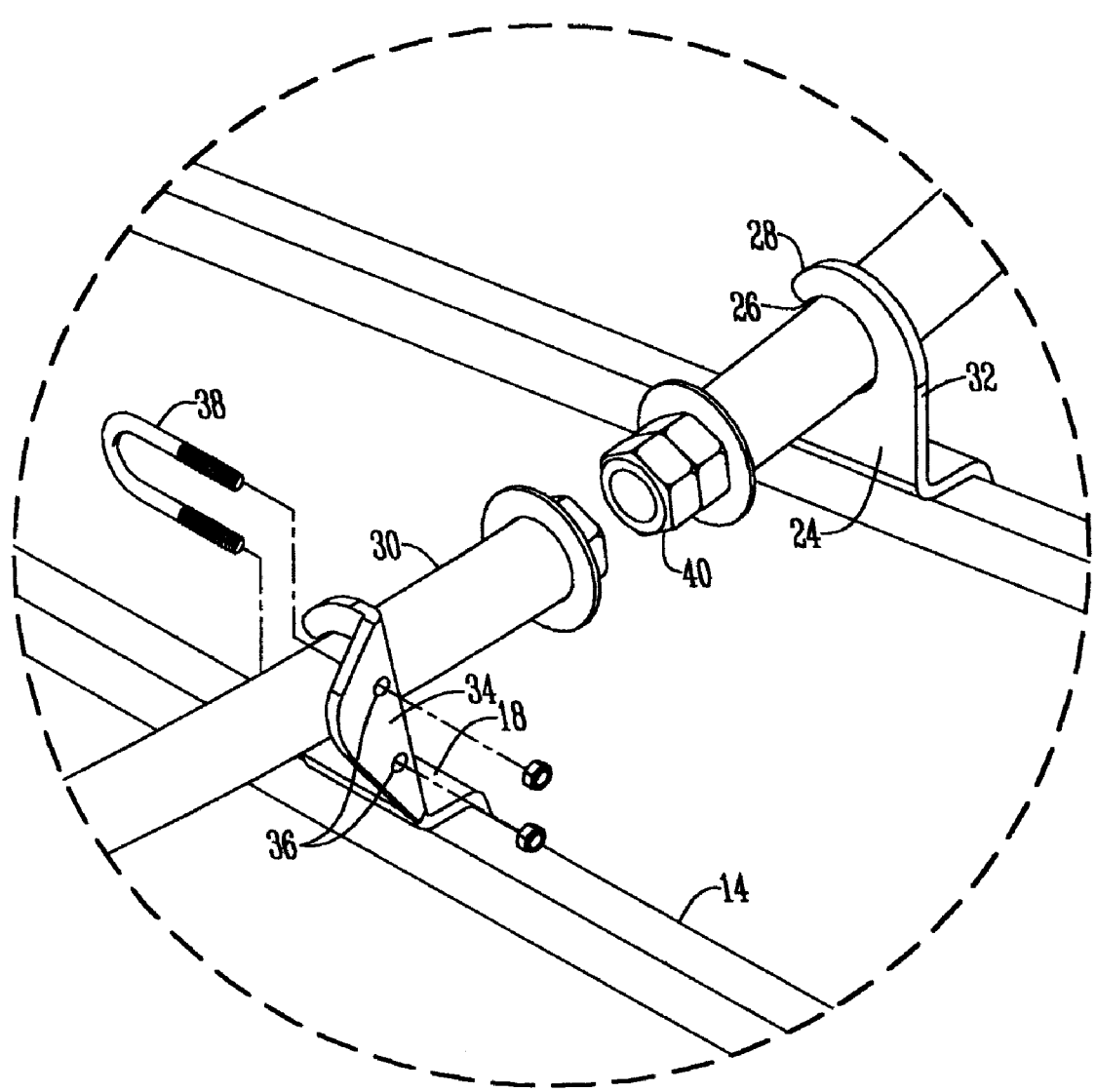
FIG. 4 is a perspective view of a roof ring secured to a mounting bracket.

Referring to the Figures, a grain bin 10 has a bin roof 12 with a plurality of roof ribs 14. Secured to the bin roof 12 is a mounting bracket 16. The mounting bracket 16 has a mounting plate 18 with a centrally located aperture 20. Preferably, the mounting plate 18 engages the top of the roof rib 14 and is secured to the roof rib 14 by a bolt 19 that extends through aperture 20. In an alternative embodiment, the mounting plate 18 has a flange 22 that extends downwardly from the mounting plate 18 and engages the side of the roof rib 14 to provide added support.

Extending generally upwardly from the mounting plate 18 is a clip portion 24. The clip portion 24 has a notch 26 on a front edge 28 that frictionally receives the roof ring 30, and a back edge 32 that is preferably angled. Extending outwardly from the back edge 32 of the clip portion 24 is a back plate 34. The back plate 34 has at least one and preferably a pair of apertures 36 that receive a U-bolt 38 or other type of retaining bolt such as a J-bolt. The bolt 38 fits around the roof ring 30 and extends through the apertures 36 to rigidly secure the roof ring 30 to the mounting bracket 16.

To assemble, the mounting bracket 16 is secured to the roof rib 14 with a bolt 19 that extends through aperture 20 of the mounting plate 18. The roof ring 30, or roof ring section, is then positioned within notch 26 of the clip portion 24 where the roof ring 30 is frictionally held in place. The bolt 38 is then placed over the roof ring 30 and inserted through apertures 36. Prior to tightening the bolts 38, the expansion nut 40 of the roof ring 30 is tightened. One skilled in the art will appreciate that the mounting bracket 16 may be used in conjunction with prior art mounting brackets such as the one shown in FIG. 1. For example, the mounting bracket can be used with a bolt at selected locations, such as every fourth rib which provides a rigid connection while also reducing cost and labor.

The flexibility of using a mounting bracket with a bolt to retain the roof ring, such as at every fourth rib, reduces cost and labor while providing a rigid connection.

Figure 5:
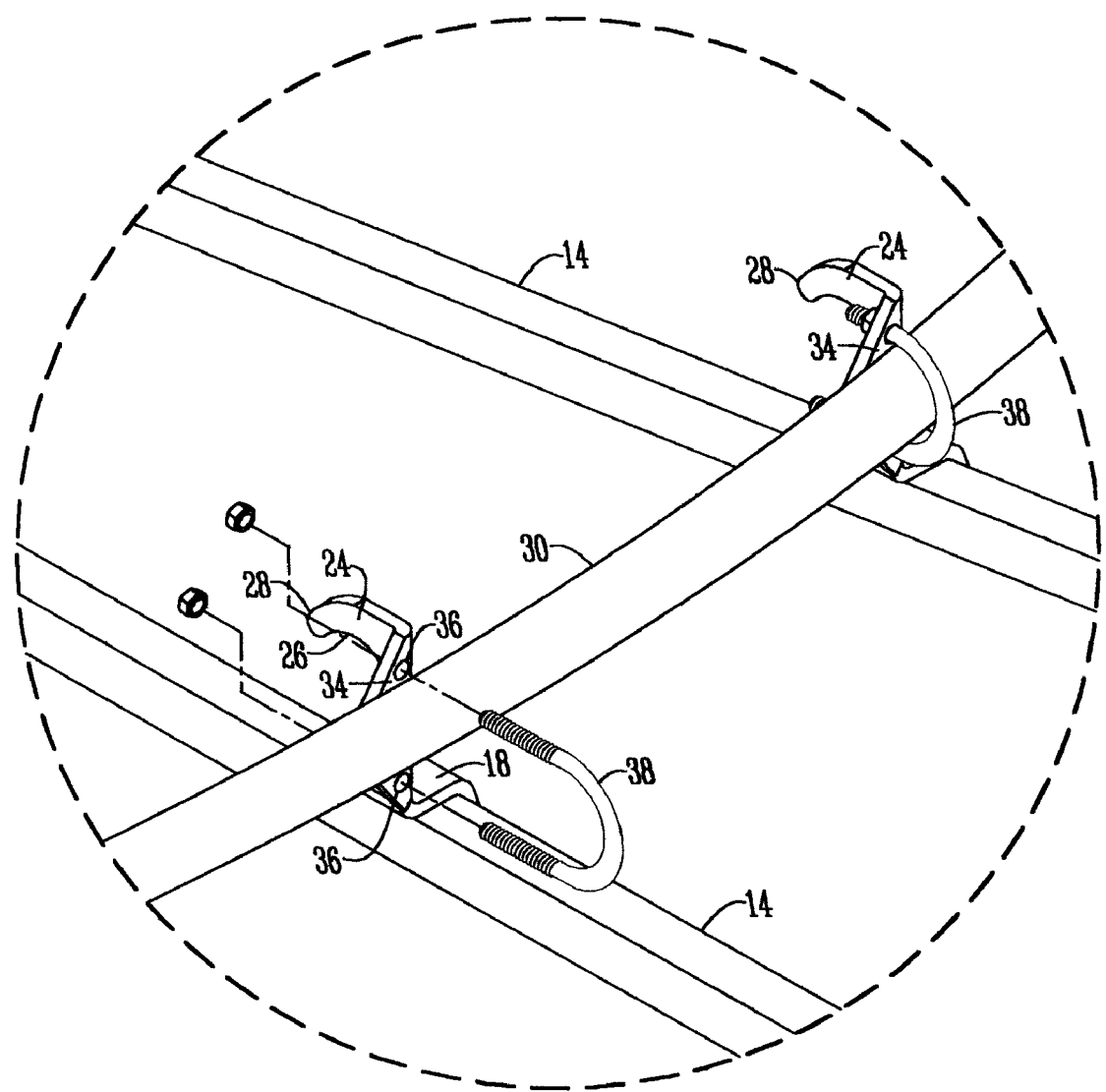
FIG. 5 is a perspective view of an alternative way of securing a roof ring to a mounting bracket.

Alternatively, particularly when larger ring roof tubing is used, the roof ring 30 is placed on the back side of the back plate 34 as shown in FIG. 5 and the bolt 38 is placed over the roof ring 30 and extends through the apertures 36 from the back side.

Figure 6:
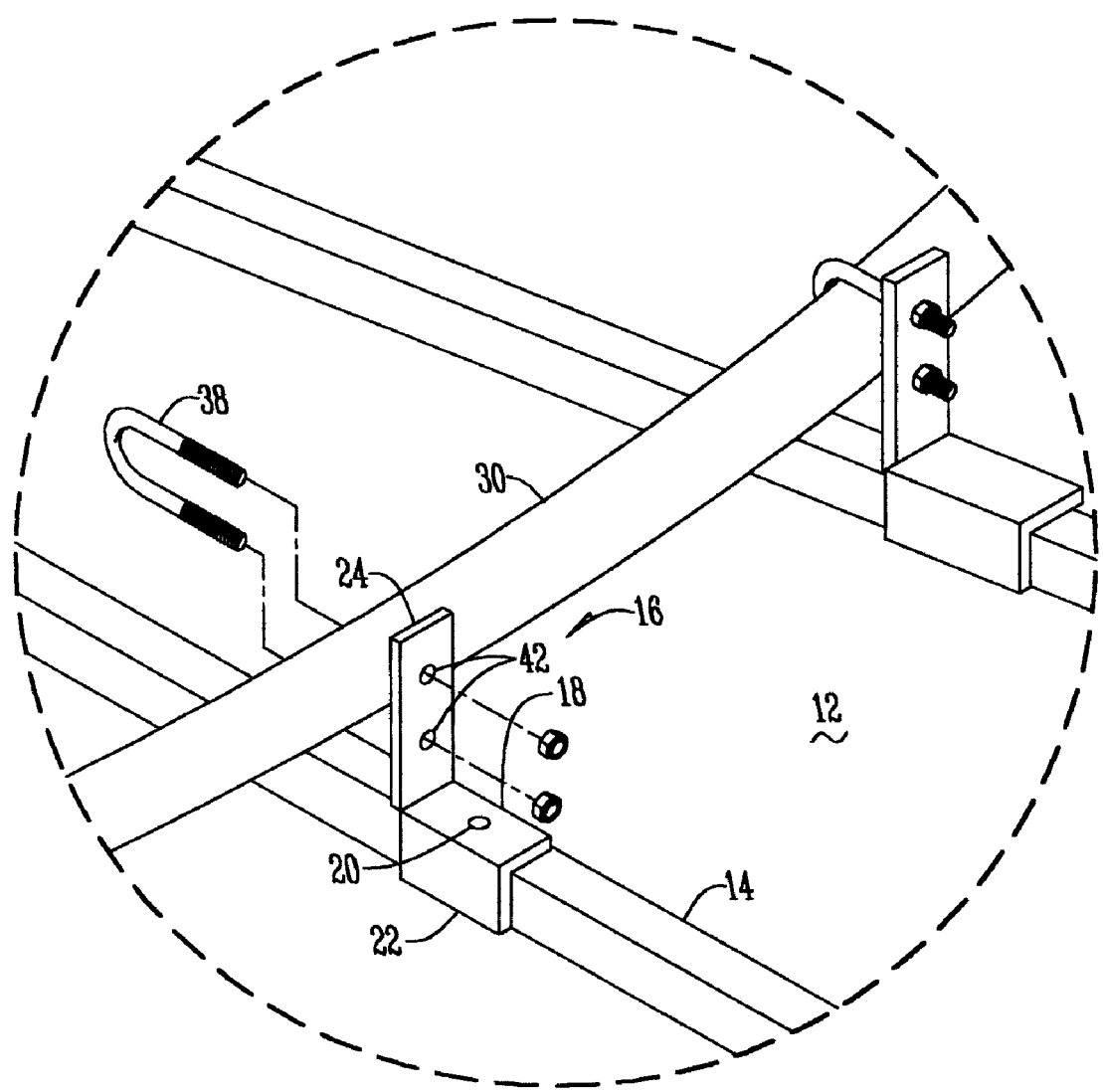
FIG. 6 is a perspective view of an alternative mounting bracket.

In an alternative embodiment, as shown by example only in FIG. 6, the clip portion 24 is transversely connected to the mounting plate 18 and extends generally in an upright direction therefrom. The clip portion 24 has a pair of apertures that receive a bolt 38.

Accordingly, from this description, the stated objective has been met.

What is claimed is:

1. A grain bin comprising:
    a bin roof having a bin roof rib; and
    at least one mounting bracket secured to the bin roof rib;
    said mounting bracket having a mounting plate secured to the bin roof rib, a clip portion that extends upwardly from the mounting plate, and a back plate that extends outwardly from the clip portion;
    said clip portion having a notch;
    a roof ring positioned within said notch;
    wherein the clip portion has an angled back edge and the back plate extends from the angled back edge of the clip portion.
2. The bin of claim 1 wherein a roof ring is secured to the mounting bracket by a U-bolt that is connected to the back plate.
3. The bin of claim 2 wherein only one U-bolt is connected to a back plate to secure the roof ring.
4. The bin of claim 1 wherein a mounting bracket is positioned at less than every rib of the bin roof.

5. The bin of claim 1 wherein the back plate has at least one aperture.

6. The bin of claim 1 wherein the angled back edge and back plate connect at an arcuate surface to provide a single piece construction.

7. A grain bin comprising:
a bin roof having a bin roof rib; and
at least one mounting bracket secured to the bin roof rib;
said mounting bracket having a mounting plate secured to the bin roof rib and a clip portion that extends upwardly from the mounting plate, said clip portion having at least one aperture;
said clip portion having a notch; and a roof ring positioned within said notch.

8. The bin of claim 7 wherein a roof ring is secured to the mounting bracket by a bolt that is connected to the clip portion.

9. The bin of claim 7 wherein the clip portion has an angled back edge and the back plate extends from the angled back edge of the clip portion.

10. The bin of claim 7 wherein the angled back edge and back plate connect at an arcuate surface to provide a single piece construction.

11. A method of installing a roof ring on a grain bin, comprising the steps of:
securing a mounting bracket having a mounting plate with a clip portion extending upwardly from the mounting plate and a back plate extending outwardly from the clip portion;
inserting the roof ring within a notch in the clip portion;
placing a U-bolt over the roof ring and inserting the U-bolt through apertures in the back plate;
tightening an expansion nut on the roof ring; and
tightening the U-bolts over the roof ring to rigidly secure the roof ring.

12. The method of claim 11 wherein the clip portion has an angled back edge.

13. The method of claim 11 wherein only one U-bolt is connected to the back plate to secure the roof ring.

14. The method of claim 11 further comprising the step of placing a mounting bracket at less than every rib of the bin roof.

* * * * *